(12) United States Patent
Sommer et al.

(10) Patent No.: US 10,300,774 B2
(45) Date of Patent: May 28, 2019

(54) ELEMENT TO BE INTEGRATED IN A GUIDE RAIL FOR A SLIDING ROOF, ROOF ARRANGEMENT AND MOTOR VEHICLE

(71) Applicant: Webasto SE, Stockdorf (DE)

(72) Inventors: Ulrich Sommer, München (DE); Mustafa Yurt, Stockdorf (DE); Michael Passenheim, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/692,790

(22) Filed: Aug. 31, 2017

(65) Prior Publication Data

US 2018/0072143 A1 Mar. 15, 2018

(30) Foreign Application Priority Data

Sep. 12, 2016 (DE) .......................... 10 2016 117 079

(51) Int. Cl.
| | | |
|---|---|---|
| *B60J 7/02* | (2006.01) | |
| *B60J 7/00* | (2006.01) | |
| *B60J 7/043* | (2006.01) | |
| *B60J 7/053* | (2006.01) | |

(52) U.S. Cl.
CPC ............. *B60J 7/022* (2013.01); *B60J 7/0084* (2013.01); *B60J 7/024* (2013.01); *B60J 7/043* (2013.01); *B60J 7/053* (2013.01)

(58) Field of Classification Search
CPC . B60J 7/0084; B60J 7/022; B60J 7/024; B60J 7/026; B60J 7/053
USPC .............................................. 296/216.08, 213
See application file for complete search history.

(56) References Cited

U.S. PATENT DOCUMENTS

| | | | | |
|---|---|---|---|---|
| 5,022,705 | A | * | 6/1991 | Takahashi ................ B60J 7/022 296/213 |
| 5,332,282 | A | * | 7/1994 | Maeda ..................... B60J 7/022 296/213 |

FOREIGN PATENT DOCUMENTS

| | | |
|---|---|---|
| DE | 10 2005 007 032 A1 | 8/2006 |
| DE | 10 2005 037 703 A1 | 2/2007 |
| DE | 10 2014 014 174 A1 | 3/2016 |

\* cited by examiner

*Primary Examiner* — Dennis H Pedder
(74) *Attorney, Agent, or Firm* — Fitch, Even, Tabin & Flannery, LLP

(57) ABSTRACT

An element to be integrated in a guide rail for a sliding roof of a motor vehicle, having a vertical wall and a flange surface which protrudes from the vertical wall and is configured to be screwed to a guide rail and to a frame part of the motor vehicle, wherein in an operationally mounted state, the flange surface points in the direction of an outer side of the vehicle, and the flange surface tapers in the direction of the vertical wall with respect to a main direction of extent of the vertical wall. According to other embodiments, a roof arrangement and a motor vehicle are provided.

13 Claims, 4 Drawing Sheets

Figur 1
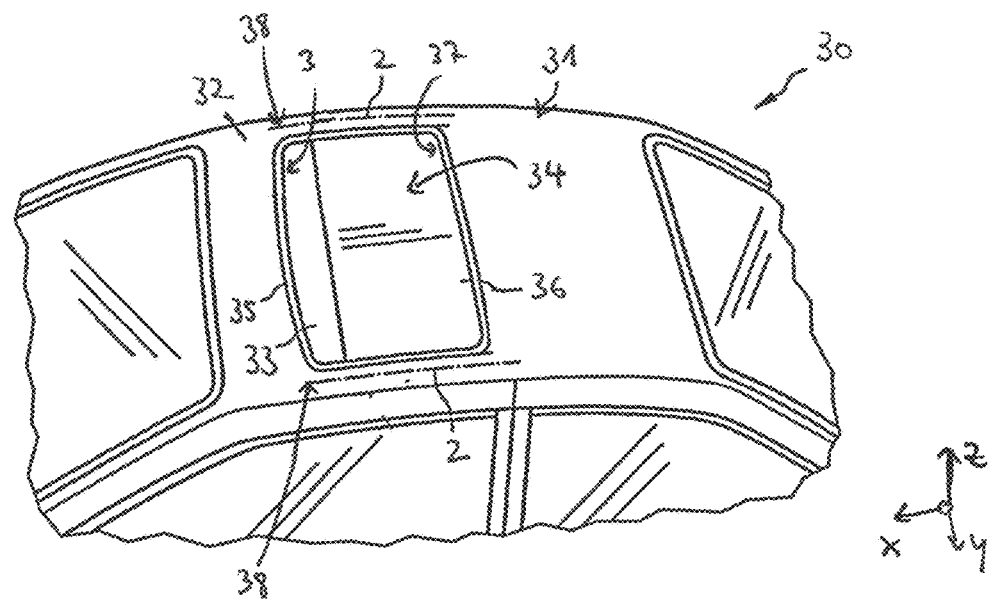
Figur 2
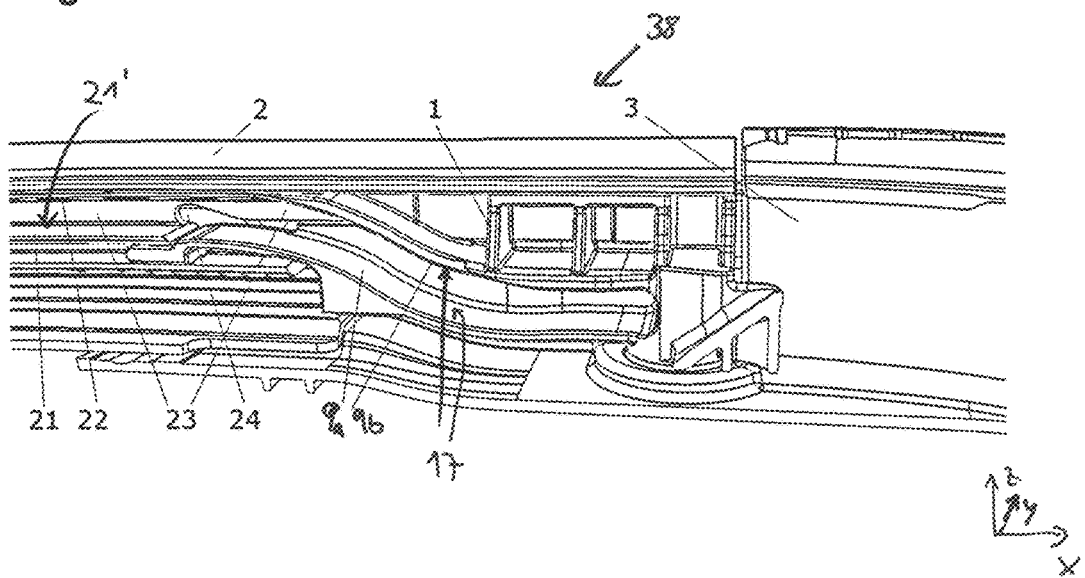

Figur 3
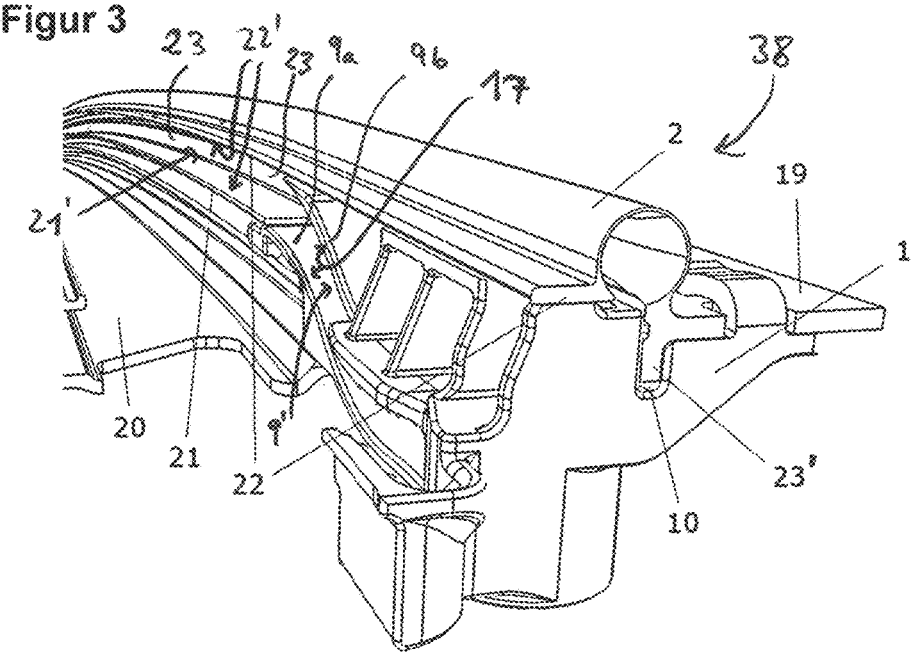
Figur 4
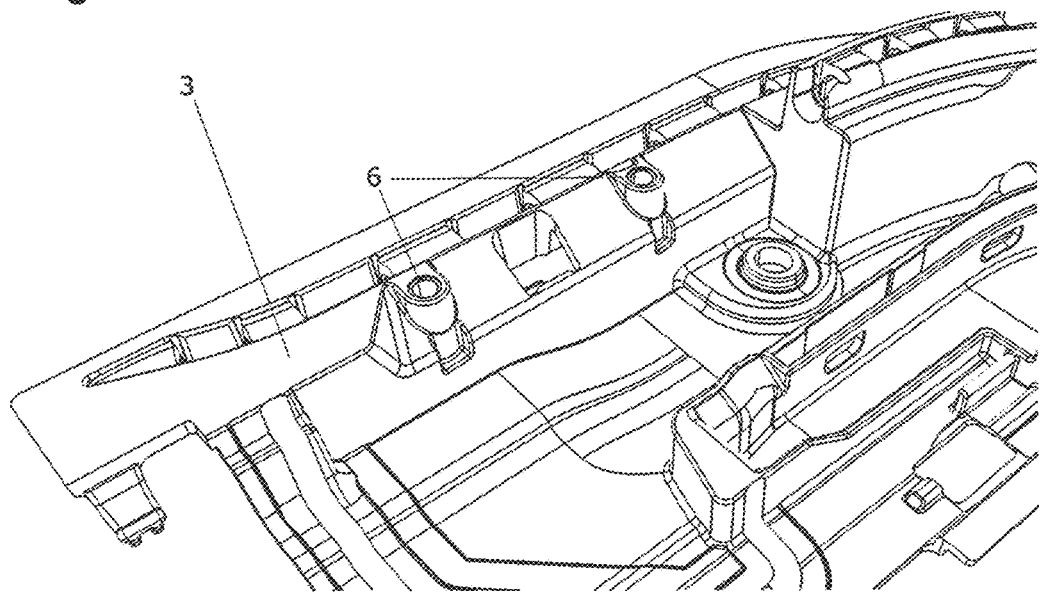

Figur 5
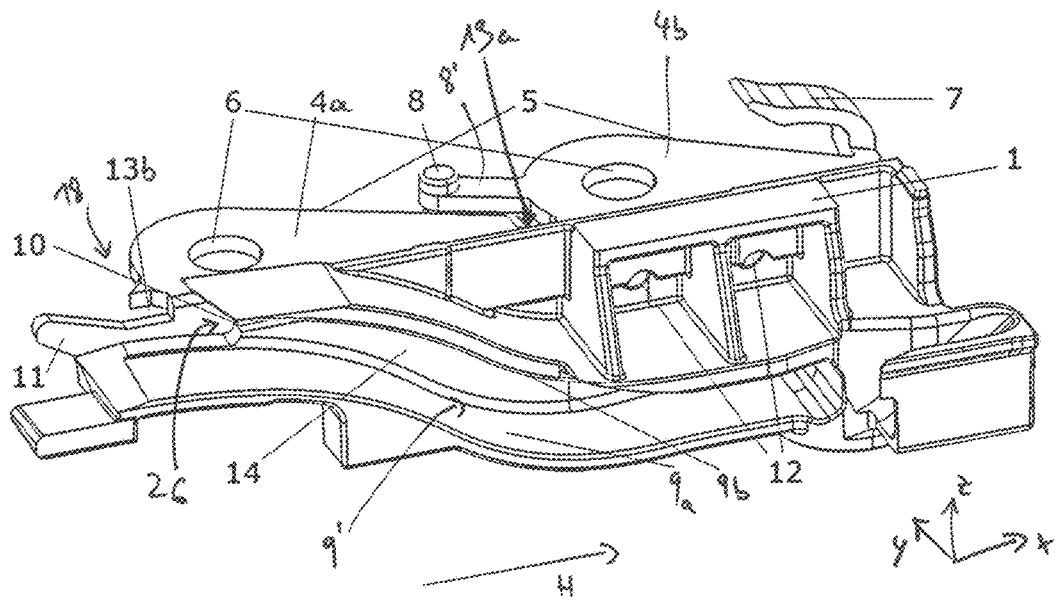
Figur 6
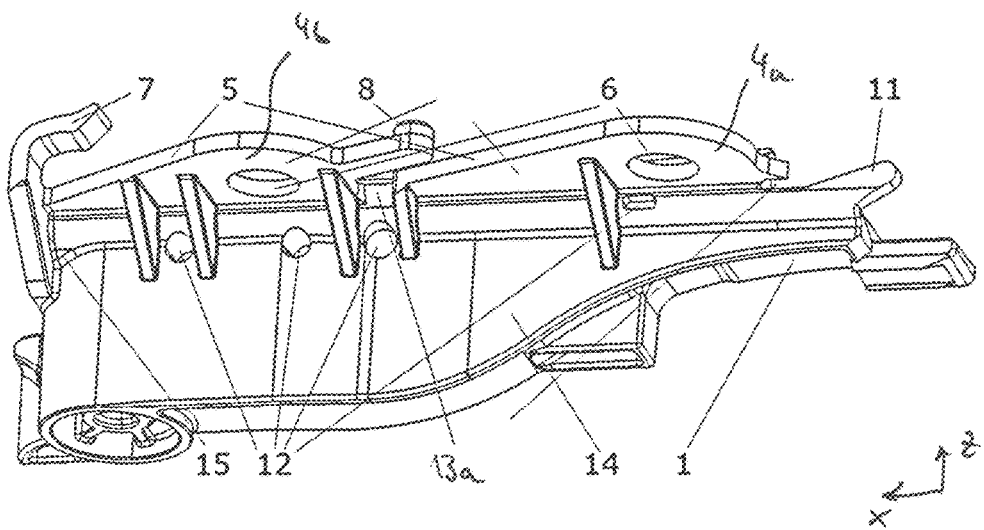

Figur 7
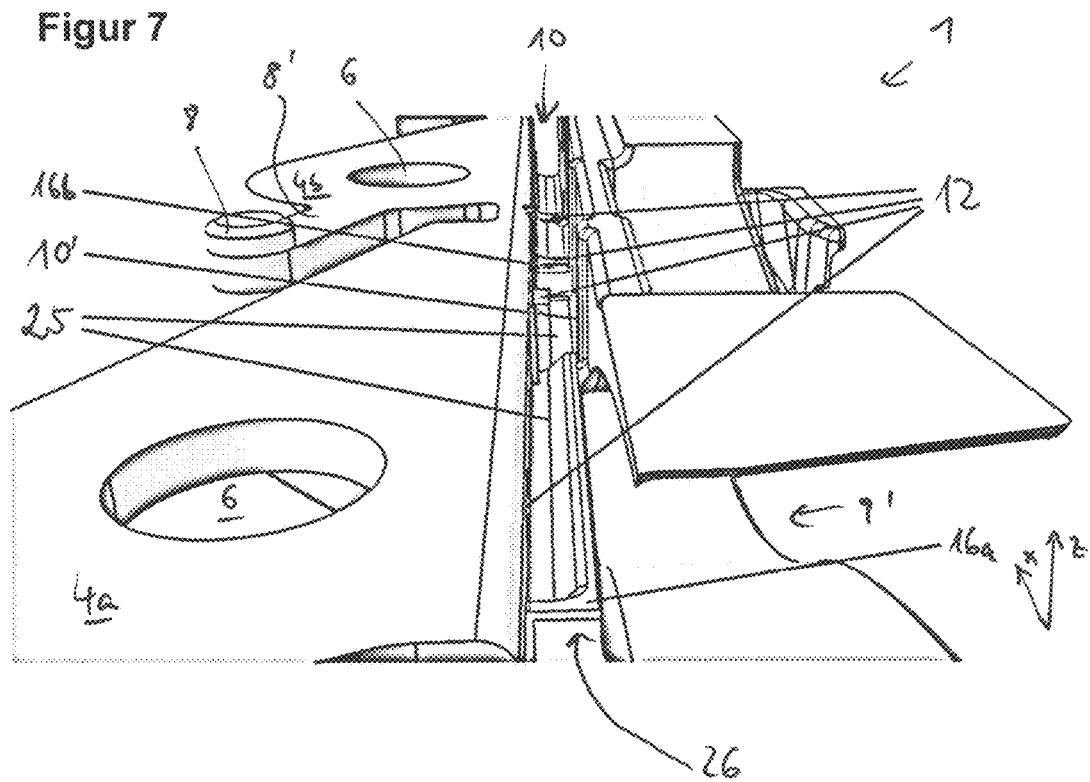
Figur 8
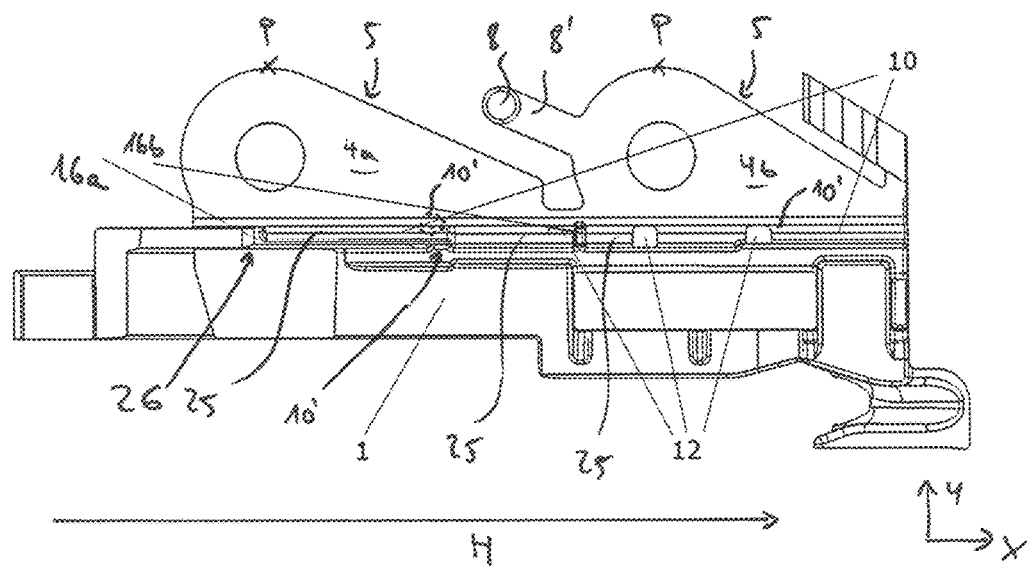

ELEMENT TO BE INTEGRATED IN A GUIDE RAIL FOR A SLIDING ROOF, ROOF ARRANGEMENT AND MOTOR VEHICLE

CROSS-REFERENCE TO RELATED APPLICATIONS

This application claims priority from German Patent Application Number DE 10 2016 117 079.8, filed Sep. 12, 2016, which is hereby incorporated herein by reference in its entirety.

FIELD

Element to be integrated in a guide rail for a sliding roof, roof arrangement and motor vehicle

BACKGROUND

Elements which are integrated in a guide rail, for example are inserted into the latter or mounted on the latter, are known for motor vehicles. Such elements are, for example, slotted lifting guides with a guide channel, said slotted lifting guides being provided at a front end in guide rails for sliding roofs in order, in a short subsection, to change a direction of movement of the kinematics for opening or closing the sliding roof in relation to a substantially rectilinear movement of the kinematics in guide channels of the guide rails, which are typically extruded. A slotted lifting guide mechanism is known from DE 102014014174 A1. Elements such as slotted lifting guides are frequently separate components, wherein, for the insertion of the elements, the guide rails are correspondingly cut out in order, for example, to permit a seamless transition of the guide channels from a guide rail to an element, such as the slotted lifting guide.

A guide rail is typically configured at the same time as a water gutter which transfers rain water penetrating through seals of the sliding roof, for example, to a front frame part which likewise has a water gutter. The front frame part can guide the water through tubes to a vehicle floor. The element, such as the slotted lifting guide, is typically virtually completely embedded in a wet region of said frame part. Only a flange region, via which the slotted lifting guide is screwed to the front frame part and also the guide rail, protrudes in a mounted state out of the wet region, in particular into a dry region of the vehicle.

An object on which the present invention is based is to describe a concept for an element for integrating in a guide rail, said concept contributing to effectively preventing water from penetrating into a dry region of a vehicle.

The object is achieved by the subject matter of the independent patent claims.

One aspect of the invention discloses an element for integrating in a guide rail for a sliding roof of a motor vehicle. The element has a vertical wall and a flange surface protruding from the vertical wall. The flange surface is configured for screwing to a guide rail for the kinematics and to a frame part of the motor vehicle. In an operationally mounted state, the flange surface points in the direction of a dry region or at least partially projects into the latter. The flange surface tapers in the direction of the vertical wall with respect to a main direction of extent of the vertical wall.

The element should be understood here and below as meaning a structural element which is integrated in the guide rail, i.e. is mounted on the latter or is connected to the latter. The element extends the guide rail, for example. For example, the element continues a slotted guide track of the guide rail. Alternatively, the element does not have a slotted guide track and constitutes a frame element which is connected to the guide rail.

According to a refinement, the element is a slotted lifting guide for controlling the kinematics of a sliding roof of a motor vehicle.

Further features and developments of the element are disclosed below in the embodiment in the form of a slotted lifting guide. The refinements which are described apply equally to elements which are not configured as a slotted lifting guide.

In the operationally mounted state of the slotted lifting guide, the main direction of extent runs parallel to the longitudinal direction of the vehicle. The tapering of the flange surface takes place in the direction of a front of the vehicle, i.e. to the front. For example, the tapering takes place at a predetermined angle which is adapted to a predetermined inclined position of the vehicle, for example a 15° inclination of the vehicle. For example, in the operationally mounted state, the flange surface points towards an outer side of the vehicle. The dry region is a region in the vehicle that should not enter into contact with water, in order to avoid damage. In particular, water could undesirably enter the vehicle interior.

A slotted lifting guide should be understood here and below as meaning a structural element which has at least one slotted guide track or guide track for controlling the movement of an engagement element, for example a pin, slider, rotary slider or the like, which can be correspondingly coupled to the slotted guide track. Furthermore, the slotted lifting guide has further elements or configurations, independently of the slotted guide track.

The slotted lifting guide is, for example, mechanically fixedly connected, for example screwed, together with the guide rail and the frame element. Use is made for this purpose of the flange surface which, for example, has a screw connection point. The slotted lifting guide has at least one slotted guide track which substantially seamlessly continues a substantially rectilinear slotted guide track of the guide rail, with a direction of movement of the kinematics being changed.

It has been recognized that, by means of the transition from the guide rail to the slotted lifting guide, in particular if the vehicle is parked on a slope, water can drip down to the transition of the flange surface to the guide rail and from there into the dry region and can enter the vehicle interior. The water enters the dry region here via various paths. Either water flows through a groove, which accommodates a remaining web of the guide rail for positioning purposes, via capillary gaps onto the flange surface of the screw connection in order to drip down from there into the dry region, or the water passes through the gap and a relatively large opening in said gap between guide rail and slotted lifting guide directly onto the flange for the screw connection of the slotted lifting guide to frame part and guide rail. In this connection, situations in which the vehicle, for example parked on a level which is inclined forwards in the direction of the vehicle and to the side by 15° in each case, remains for a prolonged period in the rain, are particularly problematic as regards the leakage.

The tapering of the flange surface of the slotted lifting guide enables water which penetrates the flange region of the slotted lifting guide under the described conditions to be conducted along the flange surface in the direction of the vertical wall, i.e. back into a wet region. In particular, in the operationally mounted state, the flange surface tapers at an acute angle along a straight line towards the inside of the vehicle, and therefore water droplets which roll along at the flute between the flange surface and a flange surface, which rests on the latter, of the guide rail are guided along the straight line over the wet region in order, for example, either to drip down into the wet region or to be conducted along a predominantly vertical wall into said wet region.

The slotted lifting guide thus eliminates or considerably reduces the risk of water being able to penetrate the dry region, without having to accept disadvantages in respect of function, strength and/or costs.

The invention therefore makes it possible for water flows which occur to be conducted in such a manner that they are reliably conducted back again into the wet region without dripping down into the dry region or the vehicle interior. In other words, the flange surface is configured in such a manner that water which has penetrated is guided to desired locations.

According to a refinement, a further flange surface is provided which, with respect to the main direction of extent of the slotted lifting guide, is arranged in front of the first flange surface and protrudes from the vertical wall, wherein the further flange surface tapers in the direction of the vertical wall with respect to the main direction of extent. The further flange surface serves analogously as above for the common screw connection to guide rail and frame element. The further flange surface is configured analogously to the first flange surface and similarly accomplishes the aforementioned advantages and functions. This further contributes to water not being able to enter the dry region of a vehicle.

According to a further refinement, a clearance is formed between the two flange surfaces. In other words, a flange surface is not provided between the two flange surfaces. In other words again, a region between the two flange surfaces is free of a flange surface. As a result, the two flange surfaces are spatially and physically separated from each other, and therefore water can drip down between the two flange surfaces and/or can pass onto the vertical wall of the slotted lifting guide.

According to a refinement, the slotted lifting guide has a channel for the form-fitting accommodating of a web of the guide rail, wherein the channel is expanded in such a manner that, in the accommodated state of the web, water can flow between the channel and the web. The channel is configured to surround or encompass the web of the guide rail in a form-fitting manner at least partially along the main direction of extent of the slotted lifting guide, for example from three sides. For example, the channel encompasses a remaining part, for example a segment, of the web. The channel is expanded in such a manner that water can flow off particularly easily through said channel. The channel is expanded, for example laterally, i.e. transversely with respect to the longitudinal direction of the vehicle and/or downwards, approximately in the direction of a vehicle floor. In the operationally mounted state, the channel forms a plurality of support points with the web; a continuous contact of the web with the wall of the channel is unnecessary.

According to a refinement, a plurality of ribs which are configured for the form-fitting accommodating of the web of the guide rail are arranged in the channel, and wherein a gutter is formed in the channel. The gutter constitutes an expansion of the channel. The web is positionally fixed in a form-fitting manner within the channel via the ribs. This contributes to the fact that water, if it has penetrated, finds sufficient room in the channel in order to be able to flow off. This avoids water accumulating.

According to a refinement, an edge which serves as a ridge is formed at a rear end of the channel. In other words, the ridge at least partially bounds the channel or the gutter of the channel. The ridge is configured to prevent water from penetrating the channel in a direction to the front with respect to the longitudinal direction of the vehicle. The ridge may also be referred to as an edge or channel web. For example, the ridge is configured in such a manner that, at the probable water inlet of the channel, the web of the guide rail is guided as tightly as possible around the entire opening up to the guide rail web in order to configure the remaining gap for the water inlet to be as small as possible. This contributes to avoiding water penetrating the channel. The ridge constitutes a barrier in order to brake the water flows.

According to a refinement, a further ridge is arranged in the channel. The further ridge is preferably arranged in front of the further flange surface with respect to the longitudinal direction of the vehicle. The further ridge surrounds the web of the guide rail, for example from three sides, and, analogously to the above-described ridge, can be considered to be a barrier.

According to a refinement, the channel has one or more holes such that water located in the channel can flow off out of the channel via the one hole or the plurality of holes. For example, these are transversely running (through) holes which are introduced into the vertical wall, for example on a lower side of the channel. The holes may also be called outflow holes. As a result, water can reliably flow out of the channel into the wet region. The holes can optionally deepen the channel. In other words, the channel has depressions or hollows in the region of the holes. This creates water sink marks, and therefore water located in the channel is conducted to the holes and removed.

The holes create outflow possibilities in order to reduce the pressure of the water located in the channel, due to which pressure said water could otherwise pass onto the flange surfaces.

According to a refinement, at least one hole is arranged in front of the further ridge with respect to the longitudinal direction of the vehicle. Arranged in front of the further ridge means that the hole lies along the longitudinal direction of the vehicle from the front to the rear in front of the further ridge and therefore in front of the further flange region. This very substantially avoids a build-up of water pressure in front of the further front ridge.

According to a refinement, an ear-shaped tab for covering one or more openings between the guide rail and the slotted lifting guide is formed at a rear end of the slotted lifting guide or a rear end of the channel of the slotted lifting guide. The tab is provided at a rear end of the slotted lifting guide with respect to the longitudinal direction of the vehicle, for example at the end pointing to the guide rail, in order to cover openings in gaps between guide rail and slotted lifting guide.

According to a further aspect, a slotted lifting guide for controlling the kinematics of a sliding roof of a motor vehicle is disclosed. The slotted lifting guide has a vertical wall and a flange surface protruding from the vertical wall. The flange surface is configured for the screw connection to a guide rail and to a frame part of the motor vehicle. The slotted lifting guide has a channel for the form-fitting accommodating of a web of the guide rail, wherein the channel is expanded in such a manner that, in the accommodated state of the web, water can flow between the channel and the web.

The slotted lifting guide of the further aspect substantially makes possible the aforementioned advantages and functions, wherein the tapering of the one or both flange surfaces is dispensed with. The slotted lifting guide of the further aspect can be developed in accordance with the previously described refinements, in particular with respect to the refinements of the channel and the features described in conjunction therewith.

According to a further aspect, a roof arrangement for a vehicle roof with a roof opening which is optionally closed or can be at least partially opened up by means of a movable roof element is disclosed. The roof arrangement has a slotted lifting guide according to one of the previously described refinements, a guide rail and a frame element. The slotted lifting guide is fixed between the guide rail and the frame element, wherein the slotted lifting guide, the guide rail and the frame element at least partially form a roof frame portion surrounding the roof opening.

SUMMARY

The roof arrangement substantially makes possible the aforementioned advantages and functions.

Furthermore, a motor vehicle is disclosed which has a roof arrangement according to the previously mentioned aspect.

Further advantageous refinements and functions are disclosed in the detailed description below of an exemplary embodiment.

The exemplary embodiment is described below with the aid of the appended figures. Elements which are similar or act in an identical manner are provided with the same reference signs throughout the figures.

BRIEF DESCRIPTIONS OF THE DRAWINGS

In the figures:

FIG. 1 shows a schematic view of a vehicle,

FIG. 2 shows a perspective view of the slotted lifting guide in a state connected to a guide rail and to a frame element, FIG. 3 shows a perspective view of the slotted lifting guide and the guide rail, FIG. 4 shows a perspective view of the frame part, FIGS. 5 to 7 show perspective views of the slotted lifting guide, and FIG. 8 shows a top view of the slotted lifting guide.

DETAILED DESCRIPTION

FIG. 1 illustrates a vehicle 30 which has a vehicle roof 31 and a roof shell 32 which is secured to the vehicle and is also called a roof skin. The roof shell 32 which is secured to the vehicle is provided with a roof opening 33 which is optionally closed or can be at least partially opened up by means of a displaceable movable roof element 34.

The roof opening 33 is surrounded by a roof frame portion 35 formed on the vehicle roof 31. The roof frame portion 35 preferably comprises guide rails 2 arranged on both sides, and one or more frame elements (see below). The movable roof element 34 is mounted displaceably in the guide rails 2. The guide rails 2 of the kinematics for the roof element 34 are arranged opposite each other in the longitudinal direction of the vehicle. Said guide rails 2 together with a front frame part 3 and a rear frame part 37 form the roof frame portion 35 as a rectangular frame for the sliding roof.

The movable roof element 34 may also be referred to as a sliding roof and preferably has a glass cover 36 and sliding elements, by means of which the movable roof element 34 with the glass cover 36 is mounted in a sliding manner in the guide rails 2.

Location indications or directional indications used, such as "rear" or "front" relate here and below to a longitudinal axis of the vehicle and to a customary direction of travel of an operationally ready motor vehicle. The longitudinal axis of the vehicle may also be referred to as the horizontal direction or x axis. A vertical direction corresponds to a y direction or y axis (see the system of coordinates shown in the figures).

A respective slotted lifting guide 1, which is described in detail below with reference to FIGS. 2 to 8, is located at a front end 38 of each of said two guide rails 2. The slotted lifting guide 1 is an element which is described at the beginning. Reference is made here only to one side of the vehicle 30 with respect to the longitudinal axis of the vehicle. The statements apply equally to the other opposite side.

FIG. 2 perspectively shows a roof arrangement with a guide rail 2 at the front end 38, a slotted lifting guide 1 and a part of the front frame element 3. The front frame element is partially cut open in the illustration for better visibility. The slotted lifting guide 1 is arranged between the guide rail 2 and the front frame element 3 and is fixed to the latter. For this purpose, the guide rail 2, firstly, is cut out and configured in such a manner, and the front frame element 3, secondly, is configured in such a manner that the slotted lifting guide 1 is arranged in a form-fitting manner on both elements and is fixedly connected mechanically thereto.

FIG. 3 shows the guide rail 2 with the slotted lifting guide 1 arranged thereon perspectively in a rear viewing direction which, during operation, approximately faces a vehicle rear.

FIG. 4 perspectively shows the front frame element 3.

FIGS. 5 to 8 show various detailed views of the slotted lifting guide 1.

The guide rail 2 has two horizontal ribs or rails 21, 22 which form a first slotted guide track 21' which runs substantially rectilinearly and may also be called guide track. The first slotted guide track 21' serves for forced guidance on both sides of one or more sliders of the kinematics for the roof element 34 (see FIG. 1, slider(s) and kinematics not illustrated). The slotted lifting guide 1 lowers lengths of said rails 21, 22, and therefore the slotted guide track 21', from a predominantly straight length via an S-shaped length profile onto a lower level in the Z direction at a front end of the overall length for the kinematics. Rectilinearly means that a profile of the first slotted guide track 21' lies approximately in a horizontal or runs approximately parallel to the roof shell 32 (see FIG. 1).

The guide rail 2 has a water gutter 20 which is bounded on an outer side or a side pointing away from a centre plane of the vehicle by a vertical web 23. From said vertical web 23, the two ribs 21, 22 project predominantly horizontally inwards or in the direction of the centre plane of the vehicle. At an upper end of the vertical web 23, a predominantly horizontal flange surface 19 or flange region for various fastening tasks is configured in a manner pointing outwards or away from the centre plane of the vehicle.

The guide rail 2 is cut out at the front end 38 in such a manner that the first slotted guide track 21' merges seamlessly into a second slotted guide track 9' of the slotted lifting guide 1. The second slotted guide track 9' is formed by corresponding ribs or rails 9a, 9b analogously to the first slotted guide track 21'. In particular, opposite functional surfaces 22' of the ribs 21, 22 and the web 23 merge seamlessly here in corresponding functional surfaces 17 of the slotted lifting guide 1.

A narrow segment 23', which remains at an upper end, of the web 23 extends here together with the flange surface 19 as far as the front end of the slotted lifting guide 1. The segment 23' optionally extends beyond the slotted lifting guide 1 and forms contact and positioning surfaces of the slotted lifting guide 1.

The lower rib 21 is milled at the top at its front end in order to ensure a smooth transition to the second slotted guide track 9', also called guide track, of the slotted lifting guide 1. In order to produce said milling, a relatively large opening is required in the vertical web 23 of the guide rail 2, said opening not being closed by a vertical wall 14 of the slotted lifting guide 1 (see FIG. 5).

In the exemplary embodiment, the slotted lifting guide 1 is formed as a single piece, for example from a metal material. The vertical wall 14 of the slotted lifting guide 1 constitutes a basic element or a base body on which all the further elements of the slotted lifting guide 1 are arranged, integrally formed and/or attached. In the operationally mounted state, said vertical wall 14 lies predominantly parallel and in a plane with the vertical web 23 of the guide rail 2. In other words, the vertical wall 14 runs along a main direction of extent H of the slotted lifting guide 1 (see FIGS. 5 and 8). From said vertical wall 14, the two ribs 9 which are curved in an S-shaped manner and run substantially parallel protrude predominantly horizontally inwards. As already mentioned, they constitute the extension of the ribs 21, 22 of the guide rail 2, wherein they end at the front end predominantly horizontally or approximately in the direction of the roof surface at a noticeably lower level in the longitudinal direction of the vehicle.

At an upper end of the wall 14 with respect to the z direction, the wall 14 is split in a y-shaped manner in order to form a channel 10 which runs longitudinally and comprises the upper remaining segment 23' of the web 23 (also see FIG. 7). In other words, the slotted lifting guide 1 has a channel-like recess for the form-fitting accommodating, for example encompassing and surrounding, of the web 23 or the segment 23'. The vertical wall 14 has the channel 10.

On an outer side of the channel 10, that is to say on a side of the slotted lifting guide 1 which faces away from the longitudinal centre plane of the vehicle during operation, the upper end of the channel 10 or the wall 14 merges into two outwardly pointing flange surfaces 4a, 4b. In other words, the slotted lifting guide 1 has two flanges 4a, 4b which extend substantially horizontally from the vertical wall 14. In the mounted state, the flange surfaces 4a, 4b lie from below against the flange surface 19 of the guide rail 2. From above, said flange surface rests on domes of the front frame part 3 via corresponding screw connection points 6. In the exemplary embodiment, the screw connection points 6 are formed by corresponding holes or screw holes. The flanges 4a, 4b are plate-like regions of the slotted lifting guide 1.

The guide rail 2, the slotted lifting guide 1 and the front frame part 3 are connected via preferably two screw connection points 6, of which in each case one is positioned relatively far to the rear in the first flange surface 4a and the other rather further forwards in the second flange surface 4 of the slotted lifting guide 1. One or more further optional screw connection points (not shown) can connect the slotted lifting guide 1 to the front frame part 3, wherein, for example, the vertical wall 14 can have such a screw connection point. More or fewer flange surfaces or flanges can optionally also be provided on the slotted lifting guide 1.

In the operational state, the slotted lifting guide 1 is virtually completely embedded downwards in what is referred to as a wet region of the front frame part 3. Only the flange surfaces 4a, 4b protrude outwards beyond the wet region into a dry region of the front frame part 3, from which water dripping down can enter the vehicle interior. The wet region is defined as that spatial region which is directed towards the longitudinal centre plane of the vehicle and in which penetrating water, for example rain water, and moisture can be located without causing damage to the vehicle. In particular, water which has penetrated during operation can drip downwards in the z direction and can flow off and/or be removed via the water gutter 20 of the guide rail 2 and/or corresponding elements of the front frame element 3, for example by means of tubes.

As is apparent in FIGS. 5 to 8, the flange surfaces 4a, 4b of the slotted lifting guide 1 towards the outside around the screw connection points 6 are configured to be at least of a size such that, for example, an edge of an embossing optionally contained in the flange 19 of the guide rail 2 can rest and as far as possible provide a seal all the way round on the surface of the flange 4.

In the exemplary embodiment, the flange surfaces 4a, 4b have a round basic shape which is in each case formed around a screw connection point 6. Each of the flange surfaces 4a, 4b tapers at an acute angle in the direction of the vertical wall 14 or in the direction of the channel 10. In the exemplary embodiment, each flange surface 4a, 4b tapers tangentially from a point P of the basic shape that defines a maximum vertical distance of a flange surface 4a, 4b from the channel 10. In other words, from said predominantly circular basic shape, the respective flange surface 4a, 4b extends forwards in the longitudinal direction of the vehicle in a tapering manner along a straight line 5 which lies tangentially on the outside against the basic shape (as seen spatially from a plane) and is guided in an as acute angle as possible as far as an upper edge of the channel 10 or the vertical wall 14. The straight line 5 may also be referred to as straight flank or rectilinear portion.

A recessed region 13a, also called first clearance 13a, without a flange surface is formed between the delimiting straight line 5 of the tapering extension of the first flange surface 4a with the rear screw connection point 6 and the second flange surface 4b, for example the beginning round basic shape of the second flange surface 4a. As a result, water or water droplets which have penetrated the flange region can follow along the tapering portion, for example along the straight line 5, and can enter into direct contact with the predominantly vertical wall of the channel 10, i.e. the vertical wall 14, and can flow off downwards into the wet region. In other words, water or water droplets would be returned from the dry region into the wet region and therefore cannot drip down into the dry region and cause damage there.

A rear flange end 18 of the first flange 4a, for example the basic shape of the first flange 4a, of the rear screw connection point 6 optionally has a forwardly pointing, small second clearance 13b, the edge delimitation of which runs rearwards on the outwardly pointing side approximately counter to a direction of travel as far as a small tip projecting beyond the circular contour, and therefore the lowest point of the second clearance 13b does not break through the circular contour inwards and penetrates the edge of embossings which may be present. The inwardly pointing delimitation of the second clearance 13b is at the same time the upper outer edge of the channel 10.

The second clearance 13b is, for example, approximately U-shaped. The second clearance 13b prevents water drops from flowing off laterally outwards and makes it easier for the latter to drip downwards or flow off on the vertical wall 14.

Such a second clearance can also be formed at a corresponding rear end of the second flange 4b.

From the round basic shape of the second flange surface 4b of the front screw-on point 6, a web 8' can point rearwards approximately parallel to the straight line 5 of the first rear flange surface 4a and at a distance from the first flange surface 4a, which is somewhat larger than a water droplet, with an upwardly protruding lug 8 being attached to the end of said web, the lug latching into a hole (not illustrated) in the flange surface 19 of the guide rail 2 as an installation aid for positioning purposes. Said obliquely running web 8' likewise serves to conduct droplets forwards and to prevent water from running outwards on the flange into the dry region in particular when a vehicle is parked on a slope. A minimum distance between a web 8' and first flange 4a is preferably at least 4 mm.

At the front end of the straight line 5 of the front flange 4, said straight line ends on a rib 15 which lies transversely and which also preferably lies at the front end of the entire slotted lifting guide 1 and which connects the narrow remainder of the front second flange 4 to the vertical wall 14. Said rib 15 protrudes outwards far beyond the straight line 5 and bears a holding lug 7 which extends rearwards through an opening in the flange surface 19 of the guide rail 2, grips from above on said flange surface 19 and likewise ensures the positioning during the installation. The holding lug 7 consists here at the front end of the extension of the rib 15 which lies transversely. At the upper end of the rib 15 which is extended through the opening upwards over the flange surface, the rearwardly pointing part of the holding lug 7 begins. This part points rearwards approximately parallel to the straight line 5 of the second flange 4b. The rearwardly pointing part of the holding lug 7 is preferably at a distance from the flange surface 4b as required for the preparation of the injection moulds so that the second flange 4b and holding lug 7 can be produced together from a vertically opening pair of moulds. For example, the size of the distance is at least 2 mm.

As already mentioned, the channel 10 of the slotted lifting guide 1 embraces the web 23 of the guide rail 2, the web remaining at the front end. The web 23 is intended here to rest or lie laterally against the (inner) walls of the channel 10 at least at so many points that the position of said channel in the transverse direction is determined by the web 23. For this purpose, for example, basically also just a few small elevations on the walls of the channel 10 are sufficient for positioning purposes.

In the exemplary embodiment, the channel 10 has a plurality of ribs 10' which interact in a form-fitting manner with the web 23 of the guide rail 2. Otherwise, a cross section of the channel 10 is widened. In other words, the channel 10 is expanded in the y direction transversely with respect to the longitudinal direction of the vehicle. In the y direction, the channel 10, i.e. opposite inner walls of the channel 10, is wider than in regions with the ribs 10'. The channel 10 is therefore expanded laterally. In addition, the channel is expanded downwards in the z direction, and therefore, in the mounted state, a relatively large gap region is substantially formed in the Z direction between channel 10 and the web 23. In other words, the channel 10 itself has a gutter 25. As a result, a cross section of the channel 10 is widened in such a manner that water can flow off unobstructed below the web 23 via the channel. The gutter 25 and the channel 10 can be divided into a plurality of portions, as shown in the exemplary embodiment, wherein cross sections and dimensions can vary.

At a rear channel end 26 with respect to the x direction, the channel 10 is open rearwards. This is a location at which water which, for example, runs along the lower rib 21 of the guide rail 2 can penetrate the channel 10. For this reason, an edge at the rear channel end 26 is raised to form a rear ridge 16a. In the mounted state, said rear ridge 16a reaches up to the web 23 as tightly, for example up to 0.5 mm, as the component tolerances permit without obstructing the mounting capability. By means of this rear ridge 16a, water is prevented as far as possible from penetrating the channel 10. The rear ridge 16a at least partially surrounds the gutter 25.

A further front ridge 16b is positioned in the channel 10 transversely through the entire channel 10 directly before the beginning of the second flange 4b of the front screw connection point 6, said further front ridge likewise reaching as tightly as possible around the web 23 within possible tolerances during operation in order to seal the channel 10 in relation to the web 23 of the guide rail 2. The front ridge 16b preferably runs on three sides in the channel 10 around the web 23 in the operationally mounted state.

Furthermore, holes 12 running transversely are optionally introduced into the wall 14 of the slotted lifting guide 1, the holes opening the channel 10 on its lower side and furthermore optionally also locally deepening the channel downwards. Water which runs forwards through the channel 10 drops into said depressions and runs out laterally through the holes 12. At least one hole 12 is arranged directly in front of the front ridge 16b, and therefore it is very substantially impossible for water pressure to build up in front of said front ridge 16b.

The combination of ridges 16a, 16b for preventing the penetration of water, the expansion of the cross section of the channel 10 and the holes 12 brings about, firstly, a minimization of the water penetrating the slotted lifting guide 1, but this combination especially prevents a rise in the water pressure which could press water into a gap between the flange surfaces 4a, 4b of the slotted lifting guide 1 and the flange surface 19 of the guide rail 2.

Between the cutout of the guide rail 2 and the slotted lifting guide 1 there is a gap 24, which may also be called a clearance or recess (see FIG. 2). Directly above the trimmed and milled end of the lower rib 21, said gap 24 has a significant increase which is produced by the milling tool for milling the rail 21. An ear-shaped protuberance or tab 11 is formed by the rear channel end 26 of the outer predominantly vertical wall of the channel 10, said protuberance or tab covering said gap 24 from the rear during operation or in the mounted state and thus preventing water from passing from below in a surge-like manner onto the rear first flange 4a and/or that so much water enters the intermediate space between frame part 3 and slotted lifting guide 1 that said water sloshes at any point out of the frame part 3.

The slotted lifting guide 1 can also have individual features of the described features. For example, the described shape of the flange surfaces 4a, 4b, which taper towards the centre of the vehicle in the direction of an anticipated water flow or of the possible slope of the vehicle when acted upon with water or taper in the direction of the wet region of the frame part 3, can be used without further features described. Similarly, the measures for reducing the water quantities and the water pressure in the channel or gutter 10 can be used without using other features, such as the configuration of the flanges 4a, 4b. These would include one or more ridges 16a, 16b for preventing the inlet of water, the increase in the cross section of the groove 10 and the holes for the water outflow 12. The ear 11 can also be used as a measure by itself or in combination with the particular configuration of the channel 10 or/and of the flange surfaces 4.

The invention claimed is:

1. Element to be integrated in a guide rail for a sliding roof of a motor vehicle, having a vertical wall and a flange surface which protrudes from the vertical wall and is configured to be screwed to the guide rail and to a frame part of the motor vehicle, wherein in an operationally mounted state, the flange surface points in the direction of a dry region, and the flange surface tapers in the direction of the vertical wall with respect to a main direction of extent of the vertical wall, wherein the element has a channel for the form-fitting accommodating of a web of the guide rail, wherein the channel is expanded in such a manner that, in the accommodated state of the web, water can flow between the channel and the web.

2. Element according to claim 1, wherein a further flange surface is provided which, with respect to the main direction of extent, is arranged in front of the flange surface and protrudes from the vertical wall, wherein the further flange surface tapers in the direction of the vertical wall with respect to the main direction of extent.

3. Element according to claim 2, wherein a clearance is formed between the two flange surfaces.

4. Element according to claim 1, wherein a plurality of ribs which are configured for the form-fitting accommodating of the web of the guide rail are arranged in the channel, and wherein a gutter is formed in the channel.

5. Element according to claim 1, wherein an edge which serves as ridge is formed at a rear end of the channel.

6. Element according to claim 1, wherein a further ridge is arranged in the channel.

7. Element according to claim 6, wherein the further ridge is arranged behind the further flange surface with respect to a front to rear direction of the vehicle.

8. Element according to claim 1, wherein the channel has one or more holes such that water located in the channel can flow off out of the channel via the holes.

9. Element according to claim 8, wherein at least one hole is arranged in front of the further ridge with respect to the longitudinal direction of the vehicle.

10. Element according to claim 1, wherein an ear-shaped tab for covering one or more openings between the guide rail and the element is formed at a rear end of the channel of the element.

11. Element to be integrated in a guide rail for a sliding roof of a motor vehicle, for controlling the kinematics of a sliding roof of a motor vehicle, having a vertical wall and a flange surface which protrudes from the vertical wall and is configured to be screwed to the guide rail and to a frame part of the motor vehicle,
wherein the element has a channel for the form-fitting accommodating of a web of the guide rail, wherein the channel is expanded in such a manner that, in the accommodated state of the web, water can flow between the channel and the web.

12. Element to be integrated in a guide rail for a sliding roof of a motor vehicle, having a vertical wall and a flange surface which protrudes from the vertical wall and is configured to be screwed to the guide rail and to a frame part of the motor vehicle, wherein in an operationally mounted state, the flange surface points in the direction of a dry region, and the flange surface tapers in the direction of the vertical wall with respect to a main direction of extent of the vertical wall, wherein the element is a slotted lifting guide for controlling the kinematics of a sliding roof of a motor vehicle.

13. Element according to claim 1, configured for a roof arrangement for the motor vehicle roof having a roof opening which is optionally closed or can be at least partially opened up by means of a movable roof element, a guide rail and a frame element, wherein the element is fixed between the guide rail and the frame element, wherein the element, the guide rail and the frame element at least partially form a roof frame portion surrounding the roof opening.

* * * * *